Feb. 11, 1958  M. FOGIEL  2,822,619
DIFFERENTIATING DEVICE
Filed Aug. 2, 1955

INVENTOR
Max Fogiel

United States Patent Office 2,822,619
Patented Feb. 11, 1958

2,822,619

DIFFERENTIATING DEVICE

Max Fogiel, New York, N. Y.

Application August 2, 1955, Serial No. 525,857

2 Claims. (Cl. 33—79)

This invention relates to a device which is attachable to drafting machines in current use and by means of which it is possible to perform directly the process of graphical differentiation.

In the analysis of mathematical functions it is a common occurrence to derive the function $y=F(x)$ from empirical data rather than an analytical expression. Under such circumstances the derivative $dy/dx$ may be obtained by seeking an analytical expression in terms of $x$ which will satisfy the conditions imposed by the empirical data and then differentiating this expression in the conventional manner. Such analytic expressions, however, are often quite involved and the process may become very tedious. In view of this fact it is a common procedure in such cases to plot the graph $y$ versus $x$ from the empirical data on a set of coordinate axes and obtaining the derivative $dy/dx$ at any point by measuring the slope of the curve $y=F(x)$ at that point. The slope of the curve at any point is equal to the tangent of the angle between the $x$ axis and the tangent line drawn to the curve at that point. Many systematic procedures have been developed for the purpose of obtaining the graphical solution of $dy/dx$ in a simple manner. One of them consists of subdividing the $x$ interval into an equal number of small increments and assuming that the average slope over the extent of the increment is proportional to the average ordinate of the curve within the same increment. In another method a tangent line is drawn to the curve by eye with the aid of a straight edge and part of this line serves as the hypotenuse of a right triangle which has one of its sides parallel to the $x$ axis and equal to unity. The length of the other side of the triangle is then equal to the slope of the curve at that point. Still another method consists of merely measuring the angle between the tangent and the $x$ axis by means of a protractor and computing therefrom the slope of the curve at the point of tangency. All the graphical differentiation methods including the ones mentioned involve the disadvantage of marking off equal or unit increments, or performing tedious measurements and computations to determine the inclination of the tangent. The apparatus described in this specification eliminates these undesirable features in the following manner.

Figure 1:
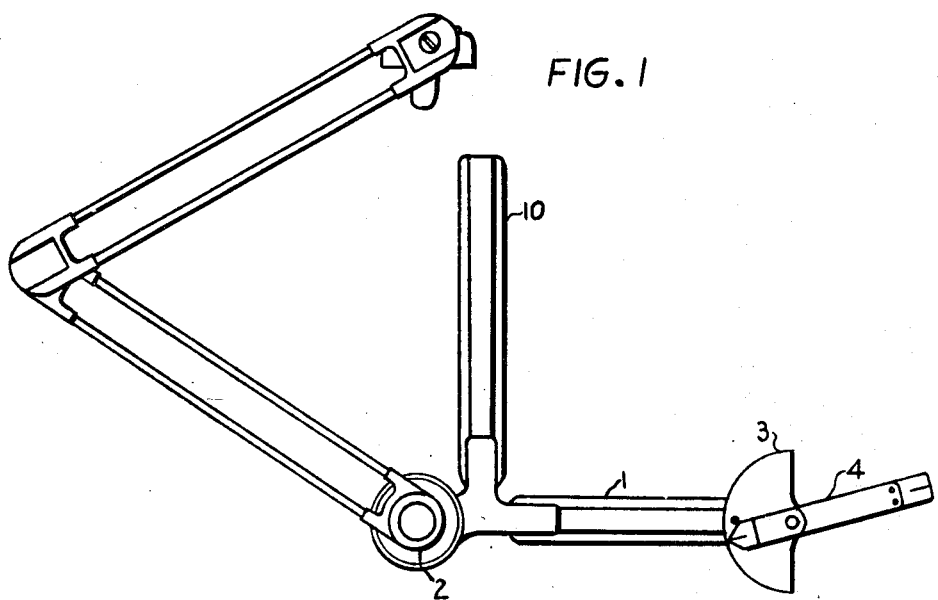
Figure 1 shows the differentiating device attached to and in relation to a typical drafting machine.
Figure 2:
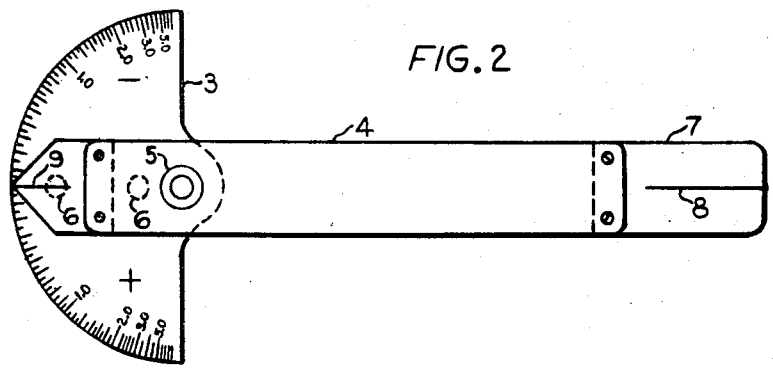
Figure 2 is a detail drawing of the differentiating device showing the arm, hairlines, and plate on which values for tangents of angles are inscribed.

Attached to the horizontal scale 1 of the conventional drafting machine shown in Figure 1 is a semi-circular plate 3. The drafting machine has the property where scale 1 will remain in the horizontal position for any position of the control head 2. Thus plate 3 will always have the same orientation for any location which is within the range of the drafting machine. Pivoted about the point which determines the center of the rim of the circular plate is an indicator 4. Indicator arm 4 is permanently fastened to plate 3 at pivot 5 in a manner which will prevent separation of the two elements without impairing their free relative motion about the pivot. Two holes 6 present in plate 3 allow a pair of screws to fasten said plate to scale 1. By extending the shaft of pivot 5 perpendicular to plate 3 and providing a corresponding opening in scale 1 in which the shaft may freely but snugly rotate so that shaft and bearing action is obtained, only one screw hole 6 is required for the purpose of fastening plate 3 to scale 1 and maintaining a given orientation between them. Arm 4 has attached to the end of it an optical magnifier 7 containing a hairline 8. This hairline is parallel to hairline 9 located at the opposite end of the arm. Inscribed near the rim of plate 3 are values for the tangent of the angle between the directed line of scale 1 and that of arm 4. Thus by moving control head 2 in the proper direction hairline 8 may be brought to any location within the range of the drafting machine. The magnifying feature of element 7 makes it possible to then accurately align arm 4 and consequently the hairline so that it is tangent to the curve at the desired point. The slope of the curve may then be directly obtained by reading on plate 3 the value to which hairline 9 is pointing. Hairline 9 is also contained in a magnifying element so that a more accurate reading may be obtained. When arm 4 is in line with scale 1 indicator 9 reads zero. The indicator points to positive values of slope as the arm is rotated in a counter-clockwise manner from the zero position. Negative values are encountered when the arm is rotated correspondingly in a clockwise manner. Selection of signs in this manner is in conformance with the mathematical sign convention. Consequently, by providing the drafting machine with this attachment it is possible to obtain a direct reading of any slope that may be encountered, and the value of this slope may be quickly obtained for any point on the curve. The same results may be obtained by securing the attachment to the vertical scale 10.

The drafting machine may be adapted for this purpose of slope evaluation in still another way. Current drafting machines permit rotation of scale 1 if desired and a protractor is provided concentric with the control head 2 to give the angle of inclination of the scale. By inscribing on the protractor values for the tangent of the angle rather than or in addition to the angle itself, and attaching to the scale an optical magnifier containing a hairline, the present drafting machine may also be employed for this purpose of graphical differentiation.

I claim:

1. A graphical differentiating device comprising in combination a drafting machine, a linear scale attached to said drafting machine, said drafting machine to retain said scale in a fixed angular position for all positions of said drafting machine, a semi-circular disk, said disk having values for the tangents of angles inscribed on it to give direct reading of the slopes of the graphical curve to be differentiated by said differentiating device, means to fasten said disk to said scale, an arm pivoted at the center of the periphery of said semi-circular disk to permit rotation and fine adjustment in the position of said arm for aligning said arm with the tangent to said graphical curve without changing the position of said drafting machine, means to fasten said arm to said semi-circular disk at said pivoting point, a first optical magnifier with hairline to indicate said tangent values inscribed on said disk, means to fasten said first optical magnifier to said pivoting arm, a second optical magnifier with hairline to magnify the portion of the curve at which the slope is to be determined and aid in adjustment of said pivoting arm to bring said pivoting arm in line with the tangent to said graphical curve, and means to fasten said second optical magnifier to said pivoting arm.

2. The differentiating device of claim 1 wherein said semi-circular disk comprises two quadrants, said quadrants having identical repeated inscriptions to provide for positive and negative slopes of said graphical curve.

References Cited in the file of this patent

UNITED STATES PATENTS

| | | |
|---|---|---|
| 1,907,873 | Richards et al. | May 9, 1933 |
| 2,033,715 | Jacob | Mar. 10, 1936 |
| 2,611,184 | Baker | Sept. 23, 1952 |
| 2,676,511 | Weisse | Apr. 27, 1954 |

OTHER REFERENCES

Publication: Science, March 14, 1950, pp. 290, 291, published by Science Press, Grand Central Terminal, New York City.